United States Patent
Yoon et al.

(10) Patent No.: US 9,575,542 B2
(45) Date of Patent: Feb. 21, 2017

(54) COMPUTER POWER MANAGEMENT

(71) Applicant: Hewlett Packard Enterprise Development LP, Houston, TX (US)

(72) Inventors: Doe Hyun Yoon, San Jose, CA (US); Moray McLaren, Bristol (GB); Dejan S. Milojicic, Palo Alto, CA (US); Robert Schreiber, Palo Alto, CA (US); Norman Paul Jouppi, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 485 days.

(21) Appl. No.: 13/755,527

(22) Filed: Jan. 31, 2013

(65) Prior Publication Data

US 2014/0215241 A1    Jul. 31, 2014

(51) Int. Cl.
*G06F 1/32* (2006.01)
*G06F 9/50* (2006.01)

(52) U.S. Cl.
CPC ............. *G06F 1/324* (2013.01); *G06F 1/3206* (2013.01); *G06F 1/3275* (2013.01); *G06F 1/3296* (2013.01); *G06F 9/5094* (2013.01); *Y02B 60/1217* (2013.01); *Y02B 60/1228* (2013.01); *Y02B 60/1285* (2013.01); *Y02B 60/142* (2013.01)

(58) Field of Classification Search
CPC ...... G06F 1/324; G06F 1/3296; G06F 9/5094; G06F 1/3206; G06F 1/3275; Y02B 60/1217; Y02B 60/1285; Y02B 60/1228
See application file for complete search history.

(56) References Cited

U.S. PATENT DOCUMENTS

| | | | | |
|---|---|---|---|---|
| 5,892,959 A * | 4/1999 | Fung | ..................... | G06F 1/3203 713/320 |
| 6,006,336 A * | 12/1999 | Watts, Jr. | ................ | G06F 1/206 713/322 |
| 6,845,456 B1 * | 1/2005 | Menezes | ............... | G06F 1/3203 713/320 |
| 6,889,330 B2 * | 5/2005 | Chauvel | .................. | G06F 1/206 307/38 |
| 7,904,287 B2 | 3/2011 | Lefurgy et al. | | |
| 7,979,729 B2 * | 7/2011 | Bletsch | ................. | G06F 1/3203 700/28 |
| 8,015,427 B2 * | 9/2011 | Miller | ....................... | G06F 1/08 712/205 |
| 2003/0204758 A1 * | 10/2003 | Singh | .................... | G06F 1/3203 713/320 |
| 2004/0025069 A1 * | 2/2004 | Gary et al. | .................... | 713/300 |
| 2005/0132238 A1 * | 6/2005 | Nanja | ........................... | 713/300 |
| 2006/0095807 A1 * | 5/2006 | Grochowski | .......... | G06F 1/206 713/324 |

(Continued)

OTHER PUBLICATIONS

Bhattacharya, A.A. et al., "The Need For Speed And Stability In Data Center Power Capping", (Research Paper), Jun. 5, 2012, 10 pages.

*Primary Examiner* — Jaweed A Abbaszadeh
*Assistant Examiner* — Brian J Corcoran
(74) *Attorney, Agent, or Firm* — Mannava & Kang, P.C.

(57) ABSTRACT

A power management module can select one of a plurality of different operational modes for a hardware component in a computer system based on application performance and total computer system power consumption determined for each of the operational modes.

15 Claims, 6 Drawing Sheets

(56) References Cited

U.S. PATENT DOCUMENTS

| | | | |
|---|---|---|---|
| 2007/0061021 A1* | 3/2007 | Cohen | G05B 13/026 700/30 |
| 2007/0074011 A1* | 3/2007 | Borkar et al. | 712/227 |
| 2007/0245163 A1* | 10/2007 | Lu | G06F 1/3203 713/300 |
| 2008/0022285 A1* | 1/2008 | Cherkasova | G06F 9/505 718/104 |
| 2008/0082844 A1* | 4/2008 | Ghiasi | G06F 1/3203 713/323 |
| 2009/0198979 A1* | 8/2009 | Verdun | G06F 1/3203 712/229 |
| 2009/0235108 A1* | 9/2009 | Gold | G06F 1/206 713/500 |
| 2010/0058350 A1* | 3/2010 | Boss | G06F 9/5094 718/104 |
| 2011/0004575 A1 | 1/2011 | Yang et al. | |
| 2011/0022833 A1* | 1/2011 | Nussbaum et al. | 713/100 |
| 2011/0113269 A1* | 5/2011 | Park | G06F 1/3203 713/310 |
| 2011/0131431 A1* | 6/2011 | Akers | G06F 9/5027 713/320 |
| 2011/0173474 A1* | 7/2011 | Salsbery | G06F 1/206 713/323 |
| 2011/0239006 A1* | 9/2011 | Hsu et al. | 713/300 |
| 2011/0239010 A1* | 9/2011 | Jain et al. | 713/310 |
| 2012/0054503 A1 | 3/2012 | Hsiao et al. | |
| 2012/0144219 A1 | 6/2012 | Salahshour et al. | |
| 2012/0210156 A1 | 8/2012 | Allen-Ware et al. | |
| 2013/0212410 A1* | 8/2013 | Li et al. | 713/300 |

\* cited by examiner

COMPUTER POWER MANAGEMENT

BACKGROUND

Energy consumption is becoming a factor in the design of all types of computer systems. In large-scale data centers, power can determine the maximum possible system sizes, and is also a major element of the operating costs. In mobile devices, the limited energy storage capacity of batteries requires very efficient operation to give acceptable battery lifetimes.

Modern hardware provides controls that allow tradeoffs between energy consumption and performance. For example, in order to reduce energy consumption, a processor clock rate can be reduced. When the clock rate is reduced, the processor supply voltage can also be reduced as the processor now has a longer cycle time allowing more time for logic gates to switch. This technique is known as Dynamic Voltage and Frequency Switching (DVFS). In another example, in mobile devices, displays may be dimmed to minimize energy consumption.

BRIEF DESCRIPTION OF THE DRAWINGS

Embodiments are described in detail in the following description with reference to the following figures. The figures show examples of the embodiments and like reference numerals indicate similar elements in the accompanying figures.

DETAILED DESCRIPTION

For simplicity and illustrative purposes, the principles of the embodiments are described by referring mainly to examples thereof. In the following description, numerous specific details are set forth in order to provide a thorough understanding of the embodiments. It is apparent however, to one of ordinary skill in the art, that the embodiments may be practiced without limitation to these specific details. In some instances, well known methods and structures have not been described in detail so as not to unnecessarily obscure the description of the embodiments.

According to an embodiment, power management for a computer system is performed based on application behavior and total power consumption of the computer system. For example, power consumption is monitored for the whole computer system. This information is fed into a closed-loop control mechanism, which adapts to changing workload behavior by adjusting processor controls and other components to achieve maximum performance within a set of energy constraints or the minimum energy usage within a set of performance constraints.

Figure 1:
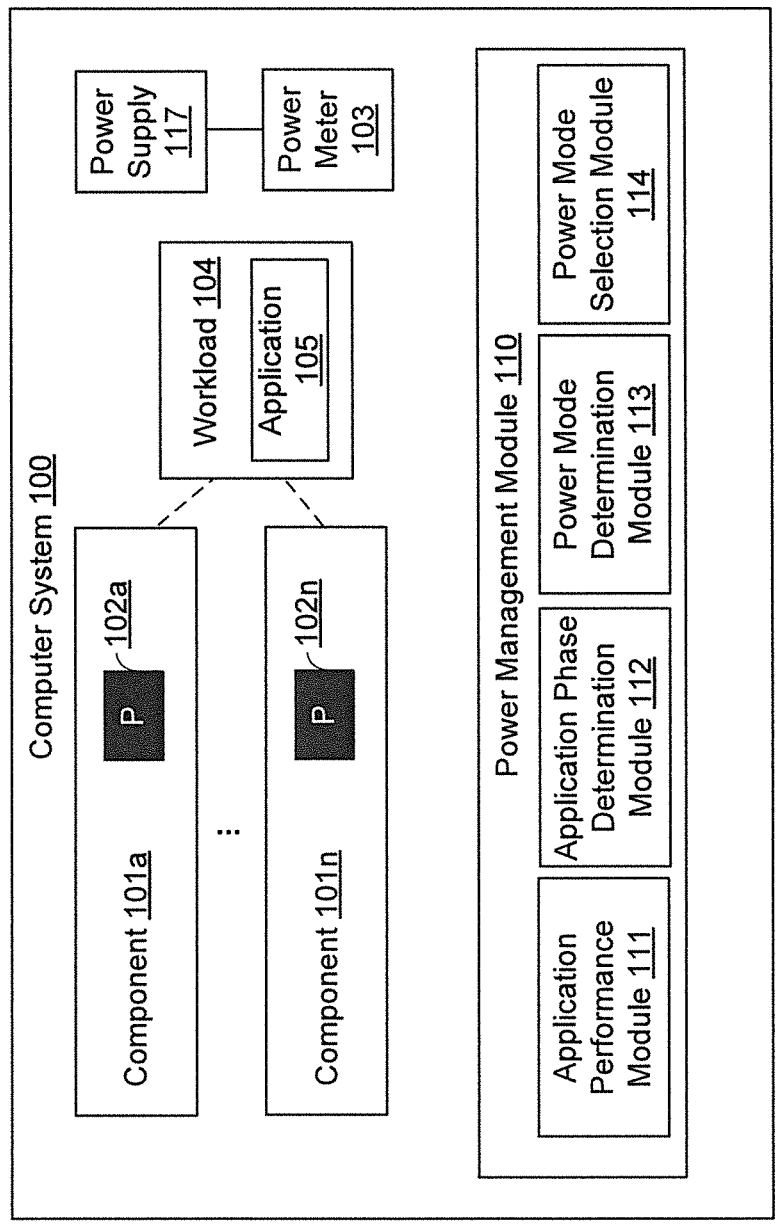
FIG. 1 illustrates a computer system with a power management module.

FIG. 1 illustrates a computer system 100 including a power management module 110 according to an embodiment. The computer system 100 includes components 101a-n. The components 101a-n may include hardware components of the computer system 100, such as central processing unit (CPU cores), which may be provided in one or more sockets, memory controllers, memory, caches, hard drives, network interface card (NIC), etc. The computer system 100 may be a server, personal computer, mobile device or another type of computer system. The computer system 100 runs a workload 104 which may include one or more software applications, such as application 105. The computer system 100 uses the components 101a-n to run the workload 104. For example, the application 105 includes machine readable instructions executed by one or more CPU cores and using memory and caches to execute.

The components 101a-n may have profiling modules 102a-n to determine performance metrics for the components 101a-n utilized to run the workload 104. For example, the profiling module 102a-n for cores, caches, memory controllers, memory, and peripherals can determine and report resource utilization, operating condition, temperature, status and other statistics of each component. In one example, if the component 101a is a CPU core, the profiling module 102a is a CPU performance counter. The performance counter may measure floating-point operations per second (FLOPS) and/or instructions per second (e.g., MIPS-million instructions per second). In another example, the profiling module for a cache may measure the number of cache misses. The profiling modules 102a-n may store the counts of hardware-related activities. In one example, a profiling module may store measured values for example in registers, which can be retrieved by the power management module 110. In another example, a profiling module may be a sensor on a motherboard that can be polled for its measured values.

The computer system 100 includes a power supply 117 supplying power to the components 101a-n and the power management module 110. A power meter 103 may be connected to the power supply 117 to determine a total power consumption of the computer system 100. The power meter 103 can be on the motherboard, or external, and can be polled for its measured values. The total power consumption of the computer system 100 may include the power consumed by the entire computer system 100, e.g., including power consumption of the components 101a-n, the power management module 110 and any hardware resource in the computer system 100 consuming power. The energy consumption for any given time interval may be calculated from the series of power consumption measurements in the region of that time interval.

One or more of the components 101a-n may be able to function in different operational modes. Performance and power consumption of a component may vary depending on the operational mode. For example, DVFS may be performed for a CPU core. Each operational mode for example is for different clock frequency and voltage. When the clock rate is reduced to a lower frequency, the supply voltage for the core or socket can also be reduced as the processor now has a longer cycle time. This results in reduced power consumption for lower frequencies for the core. However, performance of the core is reduced as well at lower frequencies, such as lower MIPS or FLOPS.

The power management module 110 receives performance metrics from the profiling modules 102a-n and power consumption measurements from the power meter 103 to implement power conservation actions for one or more of the components 101a-n. For example, the power management module 110 determines behavior of the workload 104 and total power consumption of the computer system 100 to determine whether to change operational modes of one or more of the components 101a-n to minimize power consumption.

The power management module 110 for example includes application performance module 111, application phase determination module 112, power mode determination module 113 and power mode selection module 114. The application performance module 111 determines a performance metric related to the workload 104 running on the computer system 100. The performance metric may be a measurement associated with utilization of one of the components 101a-n and may be measured by its profiling module. The application performance module 111 can collect performance metrics for one or more of the components 101a-n from profiling modules 102a-n. The metrics may be collected over a bus in the computer system 100. These metrics may be used to estimate the behavior of the workload 104.

The application phase determination module 112 determines the operating phase of the workload 104. For example, the application 105 may have multiple execution phases. The application 105 may vary between a stable phase and a non-stable phase of execution. A stable phase is determined by a relatively steady state of the application 105 measured by one or more of the performance metrics. For example, to estimate whether the application 105 is in a stable phase, the application phase determination module 112 checks instruction execution rates (e.g., MIPS) from profiling modules, which may be performance counters, for CPU cores. If the MIPS numbers are substantially the same, for example within predetermined tolerances such as +−5% (or some other percentage), over successive intervals, the application phase determination module 112 determines the current execution phase is stable.

If the current execution phase is stable, the power mode determination module 113 changes operational modes of one or more of the components 101a-n, while determining the total power consumption for each of the operational modes. For example, an operational mode is executed for a time interval and the total power consumption is determined for the time interval, and then the process is repeated for different operational modes. Also, a performance metric may be determined for each interval. In one example, the frequency of a core and voltage are varied and total power consumption and instructions per second are determined for each frequency.

The power mode selection module 114 selects one of the plurality of operational modes determined to have an optimum application performance and optimum total power consumption based on the information determined by the power mode determination module 113 for each operational mode. The optimum operational mode may include an operational mode whereby the total power consumption of the system is reduced over a time period. For example, if the frequency and voltage are reduced for a core but it causes the execution time of the application 105 to increase, then total power consumption of the computer system may not be reduced for a given time period. However, if the execution time is not increased or if it is increased but still results in energy savings, the operational mode may be selected. The selected operational mode is then implemented. For example, the power mode selection module 114 instructs the core or another component to enter the selected operational mode. Performance constraints may be specified and an optimum operational mode may be selected that minimizes energy consumption and allows the application to satisfy performance requirements, such as response times.

The power management module 110 may be implemented entirely in hardware, or as software comprised of machine readable instructions executed by a dedicated management processor, or as software executed by a CPU core in a socket that can also run the workload 104.

Figure 2:
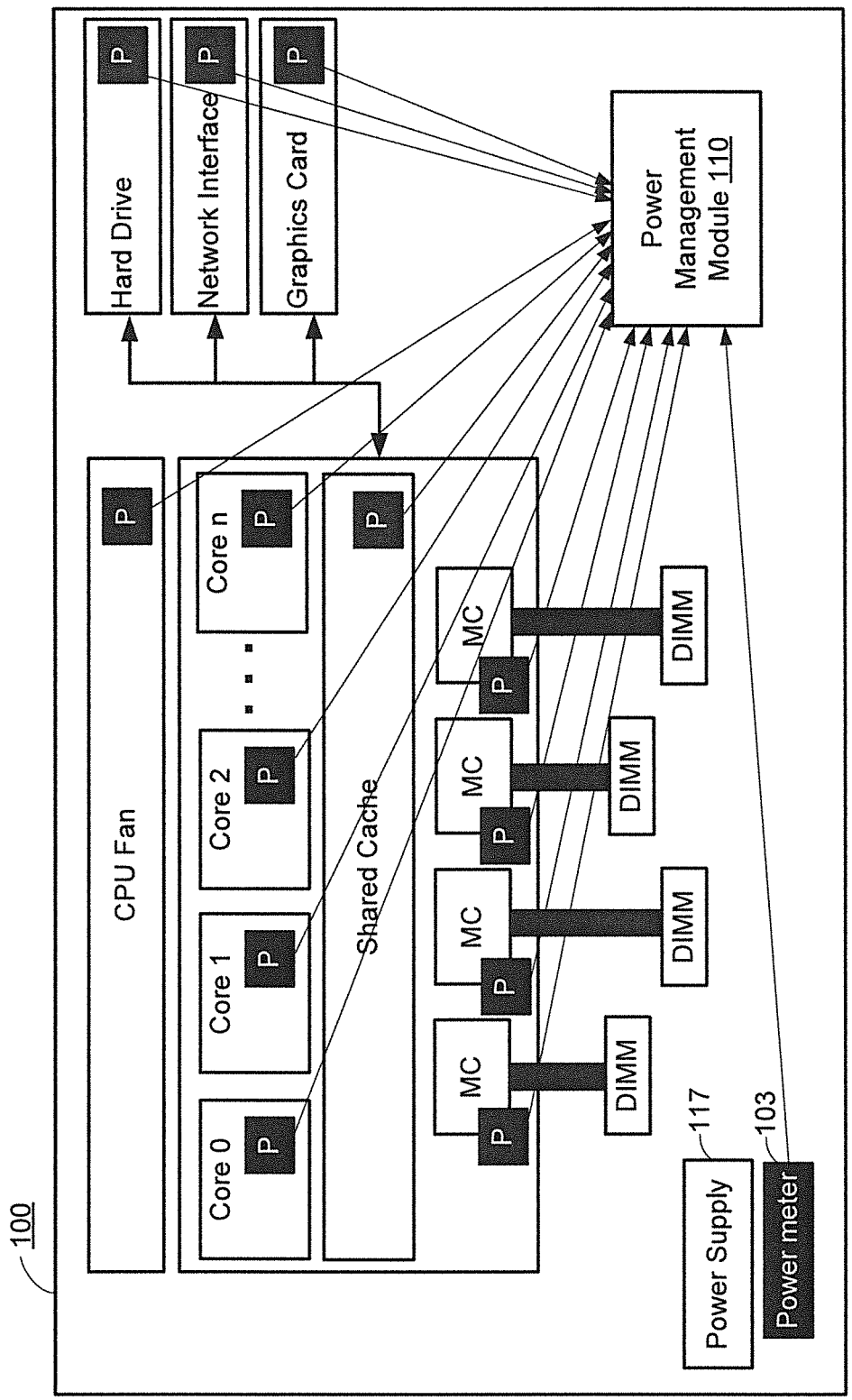
FIGS. 2 and 3 illustrate components in the computer system and information exchanged between the power management module and a power meter and profiling modules.

FIG. 2 shows an example of the components 101a-n in the computer system 100. For example, the components 101a-n include a CPU fan, a socket comprising cores 0-n, a shared cache, memory controllers shown as MC and connected to memory modules shown as DIMMs (dual in-line memory modules), and peripherals including a hard drive, network interface and graphics card. The arrows from the profiling modules to the power management module 110 represent that the power management module 110 (e.g., application performance module 111 in the power management module 110) is collecting metrics from the profiling modules. The metrics may include measurements for component utilization, temperature, power if local power metering for a component is available, and other statistics. The power management module 110 may periodically collect the metrics from the profiling modules. In one example, a profiling module may store the metrics in a circular buffer and the power management module 110 retrieves the metrics from the buffer. Also, the power management module 110 gets the power consumption metrics from the power meter 103 continuously or periodically.

Figure 3:
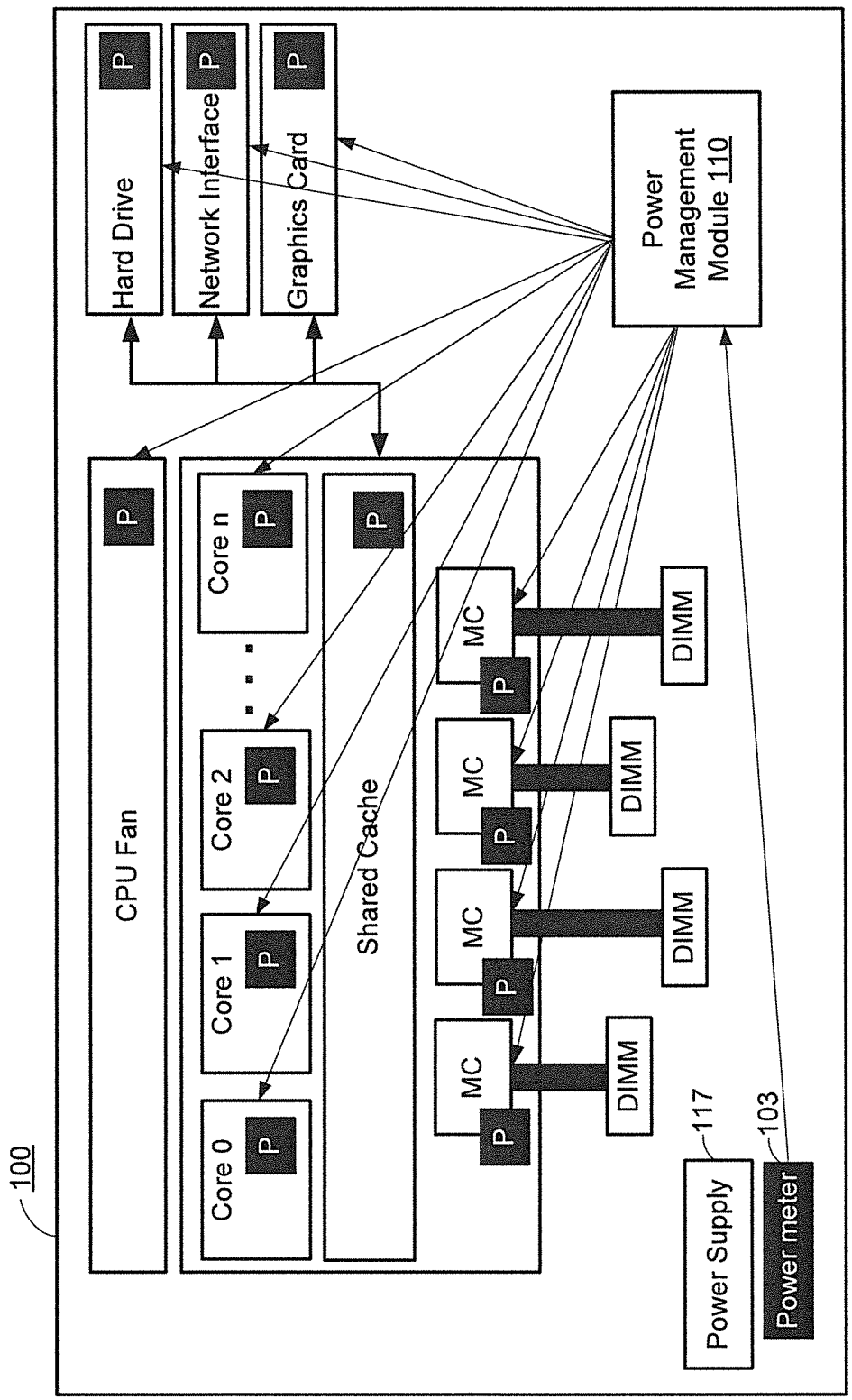

Although not shown in FIGS. 2 and 3, the workload 4 shown in FIG. 1 executes using components shown in FIGS. 2 and 3. If the application 105 in the workload 104 is determined to be operating in a stable execution phase, the power management module 110 changes operational modes of various components, while determining the total power consumption of the system 100. The arrows in FIG. 3 represent the power mode determination module 113 in the power management module 110 sending instructions to one or more of the components to change operational modes while getting power measurements from the power meter 103.

For example, the power mode determination module 113 changes CPU frequency for one or more of the cores. The power mode determination module 113 may use different strategies to try different frequencies (and different voltages) to identify the optimum frequency for energy efficiency. For example, frequencies are tried starting from the highest frequency and decreasing the frequency after operating at each frequency for a predetermined time interval, and total power consumption is determined for each time interval. In another example, frequencies are tried starting from the lowest frequency and increasing the frequency at each consecutive interval. Each frequency and the corresponding voltage may be referred to as a power mode. The power mode determination module 113 may calculate energy per instruction (EPI) for each interval and for each power mode. As indicated above, EPI is energy per instruction and is equal to energy consumed over a given time interval/number of instructions executed in that interval. A low power mode (e.g., frequency and corresponding voltage) with the lowest EPI from all the frequencies that were tried may be selected and implemented. Performance of the workload may also be considered when selecting an operational mode if performance constraints are provided The power management module 110 may also try to identify and select an operational mode for other types of components other than the cores to minimize power consumption. In one example, the power management module 110 selects and implements the optimal core frequency first and then tests operational modes for one or more other components to determine whether total power consumption can be improved by implementing a different operational mode for the other components.

The power mode determination module 113 may change memory frequency if it is a dynamically adjustable parameter. For example, the power mode determination module 113 may instruct the memory controllers to change memory frequencies to identify a memory frequency that minimizes total power consumption per performance metric. Computationally intensive workloads may be less sensitive to memory bandwidth, so reducing memory frequency (and voltage accordingly) may not impact performance, but energy can be saved a lot with low-frequency memory operation. The same EPI metric and frequency searching strategies used for the CPU cores may also be used for memory.

The power management module 110 may also test operational modes of other components, such as caches, peripherals, etc., to minimize EPI. During the searching for the optimal operational mode, e.g., frequency, the power management module 110 can employ an analytical power/performance model to converge more quickly to the best operating point, which may be provided by a manufacturer. The model does not necessarily need to be very accurate because power meter measurements are collected from the power meter 103, and also a self-learning power/energy model may be employed based on observed power/energy characteristics of the computer system 100 and the application 105.

Once the optimal operational mode for one or more components is found and set, the power management module 110 keeps monitoring performance, power, and other statistics since changes in the application execution phase or other environmental parameters may make other operational modes more energy optimal for the computer system 100. Also, if a user specifies an objective other than minimizing energy, the power management module 110 can use a different metric while searching for the best operational mode.

Figure 4:
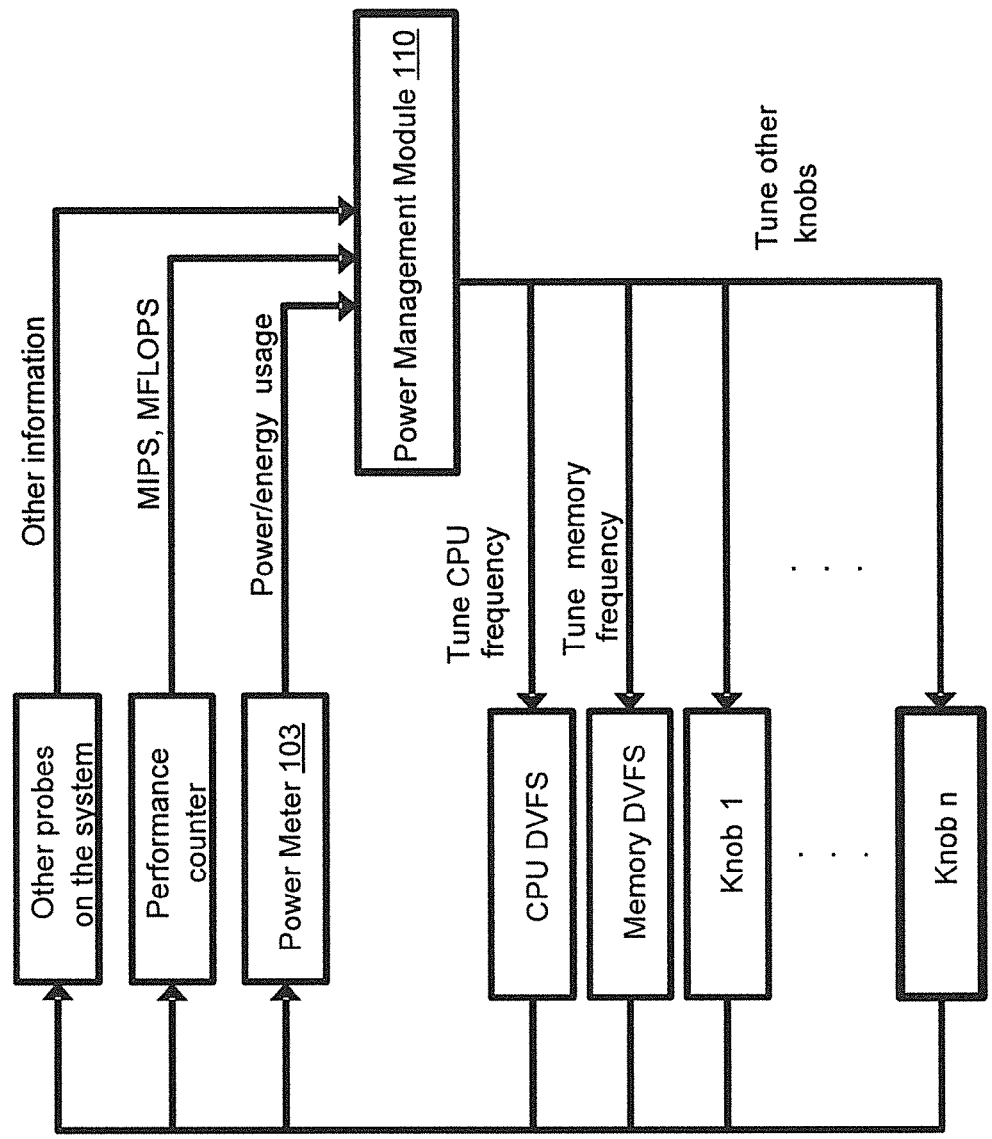
FIG. 4 illustrates a data flow diagram.

FIG. 4 shows the data flow between the power management module 110 and the components, profiling modules and other sensors in the computer system 100 shown in FIGS. 1-3. The power management module 110 collects information from the power meter 103, the profiling modules 102a-n (e.g., performance counters), and other sensors available in the computer system that measure metrics and power consumption for components. The power management module 110 performs a tuning process to test different frequencies for the CPU cores and the memory to select and implement an optimal frequency for the CPU cores and the memory. Operational modes of other components may be similarly adjusted as represented by knobs 1-n. The overall control structure for power management may be implemented as a closed loop. Also, the power management is application oblivious because power management decisions can be made without receiving input from an application that is a workload.

Figure 5:
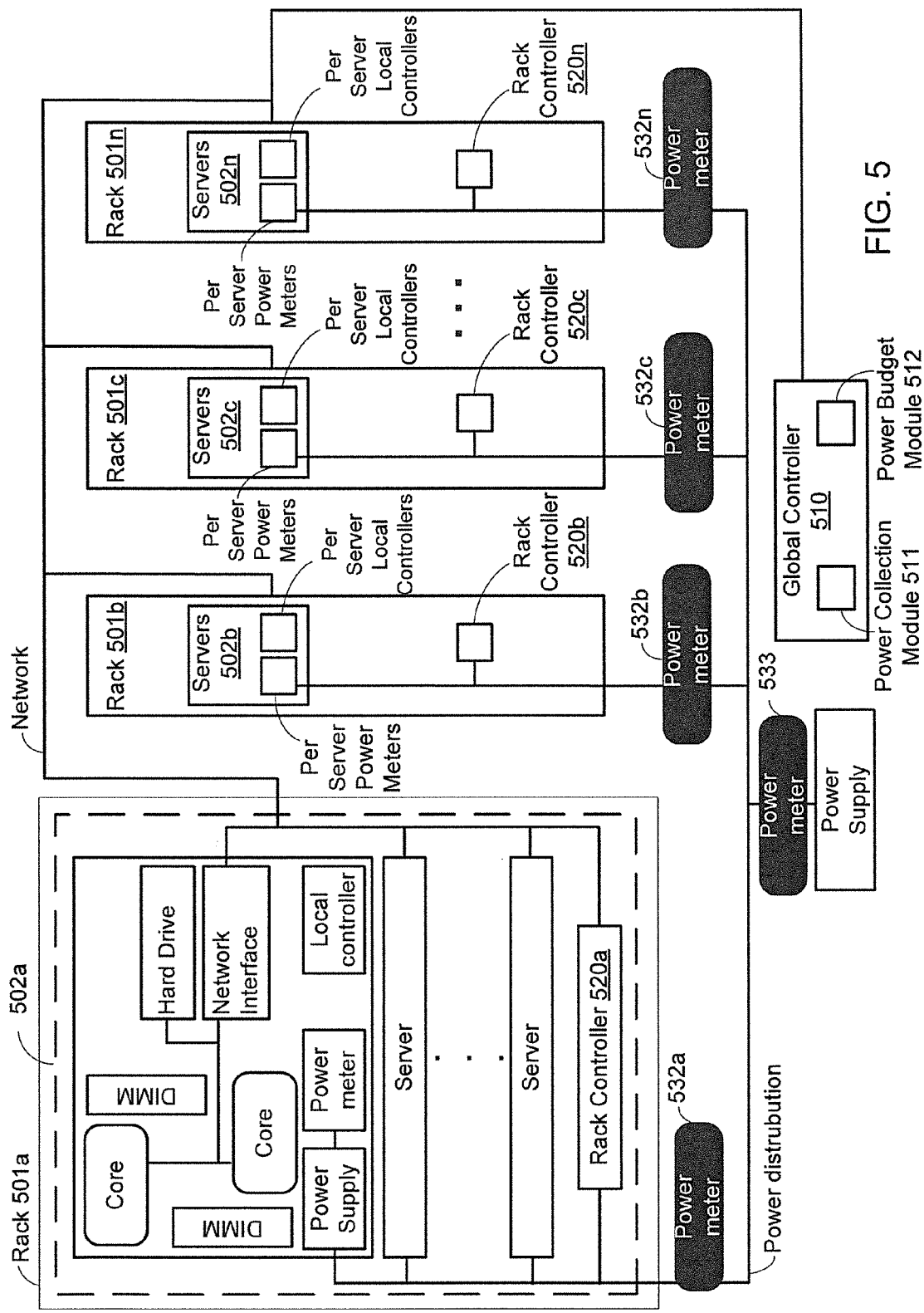
FIG. 5 illustrates a distributed computer system and controllers.

The power management module 110 can be used in a distributed computing system which may be large-scale. FIG. 5 shows an example of a distributed computing system 500 comprised of racks 501a-n and a collection of servers per rack. 502a-n represent the multiple collections of servers in the racks 501a-n, such as 502a represents the collection of servers in rack 501a, 502b represents the collection of servers in rack 501b, and so on. The distributed computing system 500 may include a global controller 510 communicating with rack controllers 520a-n for the racks 501a-n and local controllers which may be provided in each of the servers in each of the racks 501a-n. Power meters as well as other sensors for measuring power consumption, resource utilization, application performance, etc., can be installed at multiple levels, such as at the global level, rack level or server level. For example per-server power meters, per-rack power meters 532a-n, and a system-wide power meter 533 may measure power consumption and the measurements may be collected by controllers at different levels and provided to the global controller 510. The local controllers may each comprise the power management module 110 shown in FIG. 1, and send information, such as metrics for power, application performance, network usage, and idle time, to the global controller 510. Rack power for the servers in a rack can be approximated from summing the per server power if a rack controller does not provide total rack power consumption to the global controller 510. However, rack power monitoring may be useful for calculating the power of the rack excluding the servers, such as power consumed by switches, fans, etc.

The global controller 510 may set constraints (e.g., power budget per blade, allowable performance slack, etc.) and send the constraints to the local controllers. The local controllers use local measurements to optimize the blade-level power and energy with regards to the constraints received from the global controller 510. The global controller 510 may include a power collection module 511 to collect total power consumption measurements and workload metrics for each of the servers 502a-n in each of the racks 501a-n, which may be provided by the local controller for each server. A power budget module 512 may determine a total power consumption constraint (e.g., power budget) for each of the servers based on the total power consumption measurements and the workload metrics collected for each of the servers, and send the corresponding total power consumption constraint to each local controller. Parallel applications may be executed in a distributed computing system. A set of nodes comprised of one or more system components that can be placed in an energy efficient operational mode, such as described above with respect to the CPU cores, may be utilized for parallel application computations. For certain classes of parallel application it is required for efficient execution that all CPUs involved in the application operate at the same frequency. In this case a constraint may be enforced by the global controller 510 so that all nodes involved in the computation are maintained in the same operational mode.

Figure 6:
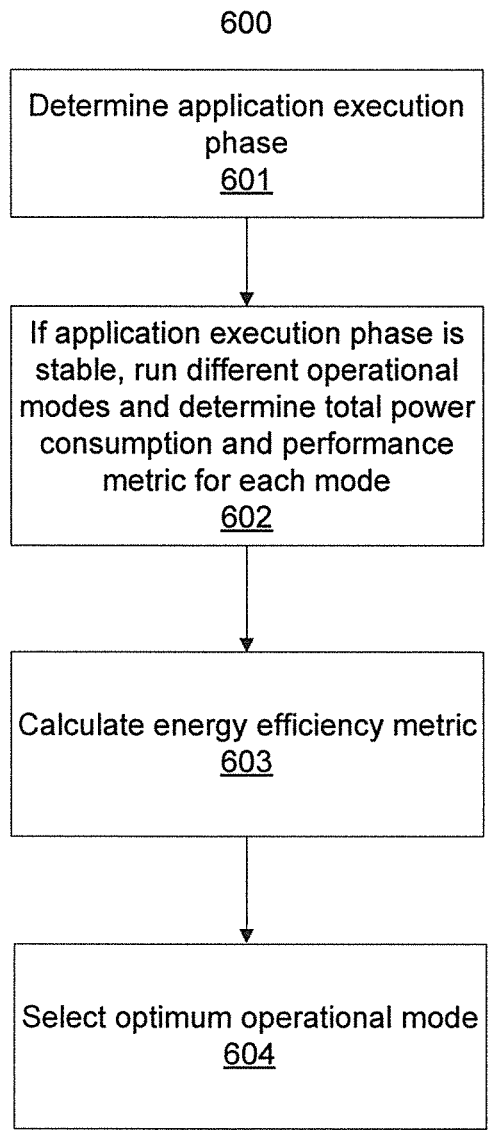
FIG. 6 illustrates a method performed by the power management module of FIG. 1.

In FIG. 6, a method 600 is described with respect to the power management module 110 shown in FIG. 1 by way of example. The method 600 may be performed by other systems. At 601, the application phase determination module 112 determines whether one or more applications, such as the application 105, running on the computer system 100 are executing in a stable phase. If the application is executing in the stable phase, at 602, the power mode determination module 113 runs a component in different operational modes and determines a performance metric and total power consumption for each operational mode. For example, frequency of a CPU core (and voltage) is varied and the performance metric and the total power consumption are determined for each frequency. The performance metric may be instructions per second for the application 105. For example, a first frequency is tried for a predetermined time interval, and total power consumption of the computer system and instructions per second are determined for the time interval. Then, a second frequency is tried for a predetermined time interval, and total power consumption of the computer system and instructions per second are determined for the time interval. This process is repeated for different frequencies.

At 603, an energy efficiency metric, e.g., EPI, is calculated from the total power consumption and instructions per second for each operational mode, which in this example is each frequency. At 604, the power mode selection module 114 selects an optimal operational mode based on an objective. For example, if the objective is energy efficiency, the operational mode is selected that consumes the least amount of energy per instruction.

The tuning process may continue for other components in the computer system 100. For example, memory may be frequency and voltage scaled to find an optimum frequency to minimize energy consumption per instruction. Also, the power management module 110 may continue to monitor the execution phase of the workload 104/application 105 and power consumption of the computer system 100 after tuning. For example, at the end of the tuning process and/or during the tuning process, the power management module 110 verifies that the application 105 is still in the same stable phase. A stable phase may be determined based on identifying a relatively steady state of the application 105. For example, if MIPS are substantially the same over successive intervals or if the EPI is substantially similar to an EPI model generated based on historic data or if the MIPS is substantially similar to an application performance model generated based on historic data, the application phase may be considered stable. If the execution phase becomes non-stable or power consumption starts increasing above expectations, the power management module 110 may instruct tuned components to return to default settings, such as settings that provide higher performance. Then, the power management module 110 continues to monitor the application execution phase to determine if it becomes stable again. If it becomes stable again, the method 600 may be repeated. Previous settings that were determined to be optimal may be leveraged for the tuning process.

Some or all of the method and operations and functions described above may be provided as machine readable instructions executable by a processor and stored on a non-transitory computer readable storage medium. For example, they may exist as program(s) comprised of program instructions in source code, object code, executable code or other formats.

While embodiments have been described with reference to the disclosure above, those skilled in the art are able to make various modifications to the described embodiments without departing from the scope of the embodiments as described in the following claims, and their equivalents.

What is claimed is:

1. A power management device for computer power management comprising:
    a processor; and
    a memory storing machine readable instructions that when executed by the processor cause the processor to:
      determine whether instruction execution rates at a plurality of components in a computer system are constant over a plurality of successive intervals during execution of an application running on the computer system;
      determine that the application running on the computer system is executing in a stable phase based on a determination that the instruction execution rates at the components in the computer system are constant over the plurality of successive intervals;
      in response to the determination that the application is executing in the stable phase, determine total power consumption of the computer system for each operational mode of a plurality of different operational modes of the components in the computer system and determine a performance metric of the application for each operational node; and
      select one of the plurality of different operational modes based on the performance metric of the application and the total power consumption of the computer system determined for each operational mode.

2. The power management device of claim 1, wherein the performance metric is instructions per second executed by the application, and to select one of the operational modes, the power management device is to
    calculate an energy per instruction for each operational mode from the instructions per second and the total power consumption determined for each operational mode, and
    select one of the operational modes providing an optimal energy efficiency based on the calculated energy per instruction for each operational mode.

3. The power management device of claim 1, wherein to determine the total power consumption of the computer system for each of the plurality of different operational modes, the power management device is to
    run the components in a plurality of different power modes, each power mode being run for a time interval, and
    determine energy consumption per performance metric for each power mode during each corresponding time interval.

4. The power management device of claim 3, wherein to select one of the plurality of different operational modes, the power management device is to select one of the plurality of power modes having an optimum energy consumption based on the determined energy consumption per performance metric for each power mode.

5. The power management device of claim 4, wherein the components include a CPU core and the plurality of power modes comprise different frequencies for dynamic voltage and frequency switching of the CPU core, and the energy consumption per performance metric comprises energy consumption per instruction.

6. The power management device of claim 5, wherein to determine the energy consumption per performance metric for each power mode, the power management device is to
    determine from a performance counter for the CPU core, a number of instructions per second performed for each of the different frequencies, and
    calculate the energy consumption per instruction for each different frequency based on the measured total power consumption and the number of instructions executed for each frequency.

7. The power management device of claim 1, wherein the power management device is to select one of a plurality of different operational modes for one of the components based on determined total power consumption and a determined performance metric for each of a plurality of different operational modes of the one component.

8. The power management device of claim 1, wherein the power management device is to further determine whether the application running on the computer system is executing in the stable phase during or after the selection of the operational mode, and if the application is determined not to be executing in the stable phase, the selection of an operational mode is repeated when the application returns to another stable phase, otherwise the selection of the operational mode is not repeated.

9. A global power controller to control power consumption in a distributed computing system comprising a plurality of computer systems executing different workloads, the global power controller comprising:
 a processor; and
  machine readable instructions stored on a computer readable medium, executable by the processor, which when executed by the processor cause the processor to:
  collect total power consumption measurements and workload metrics from each of the plurality of computer systems when an application executing on each of the plurality of computer systems is in a stable phase; and
  determine a total power consumption constraint for each of the plurality of computer systems based on the total power consumption measurements and the workload metrics collected from each of the plurality of computer systems, and send the corresponding total power consumption constraint to a local controller of each of the plurality of computer systems,
 wherein the local controller of each computer system is to
  determine that the application running on the computer system is executing in the stable phase based on a determination that instruction execution rates at a plurality of components in the respective computer system are constant over a plurality of successive intervals,
  determine application performance and total power consumption of the respective computer system for each operational mode of a plurality of different operational modes of the plurality of components in the respective computer system, and
  select one of the plurality of different operational modes determined to have an optimum application performance and total power consumption based on the determined application performance and the determined total power consumption for the plurality of different operational modes and based on the total power consumption constraint received from the global controller.

10. The global power controller of claim 9, wherein the computer systems comprise servers in racks, and the power collection device is to collect the total power consumption measurements from a rack controller for each rack or from the local controllers, and to collect the workload metrics from the local controllers.

11. The global power controller of claim 9, wherein the global power controller is to send a workload performance constraint to each local controller, and each local controller is to adjust the operational mode to a higher performance operational mode if the workload performance does not satisfy the workload performance constraint.

12. The global power controller of claim 9, wherein the components in each of the computer systems includes a CPU core and the plurality of operational modes comprise different frequencies for dynamic voltage and frequency switching of the CPU core, and the operational mode is selected based on energy consumption per instruction determined for each operational mode.

13. The global power controller of claim 12, wherein to determine the energy consumption per performance metric for each operational mode, each local controller is to
 determine from a performance counter for the CPU core, a number of instructions performed for each of the different frequencies and for a corresponding time interval, and
 calculate the energy consumption per instruction for each different frequency based on a measured total power consumption for the corresponding time interval and the number of instructions executed for the corresponding time interval.

14. The global controller of claim 9, wherein the power budget device is to enforce a constraint that all CPUs involved in a computation for a parallel application are maintained in a same operational mode.

15. A method for computer power management comprising:
 determining, by a power management device, whether instruction execution rates at a plurality of components in a computer system are constant over a plurality of successive intervals during execution of an application running on the computer system;
 determining, by the power management device, that the application running on the computer system is executing in a stable phase based on a determination that the instruction execution rates at the components in the computer system are constant over the plurality of successive intervals;
 in response to the determination that the application is executing in the stable phase, determining a total power consumption of the computer system for a plurality of different frequencies for dynamic voltage and frequency switching of a CPU core in the computer system running the application; and
 calculating an energy per instruction for each of the different frequencies based on the number of instructions executed and the total power consumption for the frequency, wherein the CPU core is set to one of the plurality of different frequencies based on the energy per instruction for the set frequency; and
 in response to a determination that the application is not executing in the stable phase, not determining the number of instructions executed and the total power consumption of the computer system for the plurality of different frequencies until the application is determined to reach the stable phase.

* * * * *